US012001231B2

(12) United States Patent
Tamura et al.

(10) Patent No.: US 12,001,231 B2
(45) Date of Patent: *Jun. 4, 2024

(54) FLOW RATE CONTROL DEVICE

(71) Applicant: TOFLO CORPORATION, Tokyo (JP)

(72) Inventors: Fumikazu Tamura, Tokyo (JP); Shinji Tobimatsu, Tokyo (JP); Masatoshi Nakamura, Tokyo (JP); Kenji Yamamoto, Tokyo (JP)

(73) Assignee: TOFLO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,872

(22) Filed: Dec. 12, 2022

(65) Prior Publication Data

US 2023/0367338 A1    Nov. 16, 2023

(30) Foreign Application Priority Data

May 16, 2022    (JP) .................. 2022-080423

(51) Int. Cl.
*G05D 7/06*    (2006.01)

(52) U.S. Cl.
CPC ......... *G05D 7/0623* (2013.01); *G05D 7/0635* (2013.01)

(58) Field of Classification Search
CPC ..... G05B 11/36; G05D 7/0623; G05D 7/0635
See application file for complete search history.

(56) References Cited

U.S. PATENT DOCUMENTS

| 11,782,461 | B1* | 10/2023 | Tamura | G05D 7/0623 |
| | | | | 700/282 |
| 2002/0189682 | A1* | 12/2002 | Linthorst | G01S 13/878 |
| | | | | 137/487.5 |

(Continued)

FOREIGN PATENT DOCUMENTS

| JP | 56-149605 A | 11/1981 |
| JP | 57-057298 A | 4/1982 |

(Continued)

OTHER PUBLICATIONS

Yoichiro Kazama, "Flow Rate Control Method" (machine translation/original document), Jun. 23, 1995, Espacenet Machine Translation and Original Document (Year: 1995).*

*Primary Examiner* — Christopher W Carter
(74) *Attorney, Agent, or Firm* — Bridgeway IP Law Group, PLLC; Sang Hoe Lee; Hyun Woo Shin

(57) ABSTRACT

A flow rate control device capable of suppressing overshoot while improving responsiveness at the beginning of flow rate control includes: a flow rate meter that measures a flow rate of a fluid flowing through a flow path; a flow rate regulating valve that regulates the flow rate of the fluid flowing through the flow path; and a control part that controls an opening degree of the flow rate regulating valve based on a measurement result of the flow rate meter, the flow rate control device has: a low flow rate rapid valve opening function that accelerates an outflow of the fluid by forcibly opening the opening degree of the flow rate regulating valve from fully closed degree to a designated opening degree when the opening degree of the flow regulating valve is fully closed and a flow rate control is started; and an overshoot suppressing function that is used for suppressing the overshoot by making the flow rate control stand by until a preset standby time or a preset flow rate threshold is reached immediately after the low flow rate rapid valve opening function works.

2 Claims, 5 Drawing Sheets

(56) References Cited

U.S. PATENT DOCUMENTS

2009/0248213 A1* 10/2009 Gotoh ................. G05D 7/0635
                                                    700/282
2013/0037112 A1*  2/2013 Smirnov ............. G05D 7/0635
                                                      137/1

FOREIGN PATENT DOCUMENTS

| JP | 61-251917 A   | 11/1986 |
| JP | 62-014201 A   | 1/1987  |
| JP | 2001-236125 A | 8/2001  |
| JP | 2012-002236 A | 1/2012  |
| JP | 2022-083102 A | 6/2022  |
| WO | 2013-115298 A1 | 8/2013 |

* cited by examiner

FLOW RATE CONTROL DEVICE

CROSS-REFERENCE TO RELATED APPLICATIONS

This application claims priority under 35 USC 119 to Japanese patent application No. 2022-080423 filed on May 16, 2022, the entire content of which is incorporated by reference herein.

TECHNICAL FIELD

The present application relates to a flow rate control device capable of improving responsiveness when flow rate control based on instantaneous flow rate is started from a flow rate of 0 L, and capable of suppressing overshoot.

BACKGROUND

In the past, a flow rate control device including a flow rate meter, a flow rate regulating valve, and a controller is known. In such a flow rate control device, usually, the controller compares a set flow rate value with a current flow rate value measured by the flow rate meter, and a valve opening degree of the flow rate regulating valve is controlled by PID (Proportional Integral Derivative) control. However, during controlling a low flow rate from the flow rate of 0L, there is a water stop margin as a valve characteristic, and deviation of the PID is small, it takes some time for the fluid to flow out, thus there is a problem of slow response.

In Patent Document 1, regarding the mass flow rate controller, if a level of the flow rate setting signal exceeds a threshold, a correction signal is outputted, and a control signal is instantaneously raised to an opening voltage of a control valve so as to improve the responsiveness for the low flow rate region, but it is a technique different from the present invention in that the opening degree of the control valve is controlled by a voltage based on a pulse signal.

Patent Document 1: Japanese Patent Application Laid-Open 2001-236125 (ESTEC Ltd)

SUMMARY

Technical Problem

The present invention is made in view of the above-mentioned problem, and its object is to provide a flow rate control device capable of suppressing overshoot while improving responsiveness at the beginning of flow rate control.

Technical Solution

In order to solve the above-mentioned problem, the flow rate control device of the present invention is characterized by comprising: a flow rate meter that measures a flow rate of a fluid flowing through a flow path; a flow rate regulating valve that regulates the flow rate of the fluid flowing through the flow path; and a control part that controls an opening degree of the flow rate regulating valve based on a measurement result of the flow rate meter, the flow rate control device has: a low flow rate rapid valve opening function that accelerates an outflow of the fluid by forcibly opening the opening degree of the flow rate regulating valve from fully closed degree to a designated opening degree when the opening degree of the flow regulating valve is fully closed and a flow rate control is started; and an overshoot suppressing function that is used for suppressing the overshoot by making the flow rate control stand by until a preset standby time or a preset flow rate threshold is reached immediately after the low flow rate rapid valve opening function works.

In addition, the flow rate control device of the present invention is characterized in that in the low flow rate rapid valve opening function, it is set that the opening degree of the flow rate regulating valve is forcibly opened from fully closed degree to the designated opening degree in the state that the opening degree of the flow rate regulating valve is fully closed and an instantaneous flow rate value measured by the flow rate meter is 0L/min.

In addition, the flow rate control device of the present invention is characterized in that in the overshoot suppressing function, in a case where a specified variation amount or less and a specified sampling times or more are detected, or in a case where a set flow rate value or more is continuously detected for a plurality of times, it is determined that the preset flow rate threshold has been reached.

Technical Effect

According to the flow rate control device of the present invention, it has the following effect: the responsiveness from the flow rate of 0L can be improved by forcibly opening the opening degree of the flow rate regulating valve from fully closed degree to a designated opening degree at the beginning of the flow rate control, and the overshoot at the beginning of the flow rate control can be suppressed by making the flow rate control stand by until a preset standby time or a preset flow rate threshold is reached.

Figure 1:
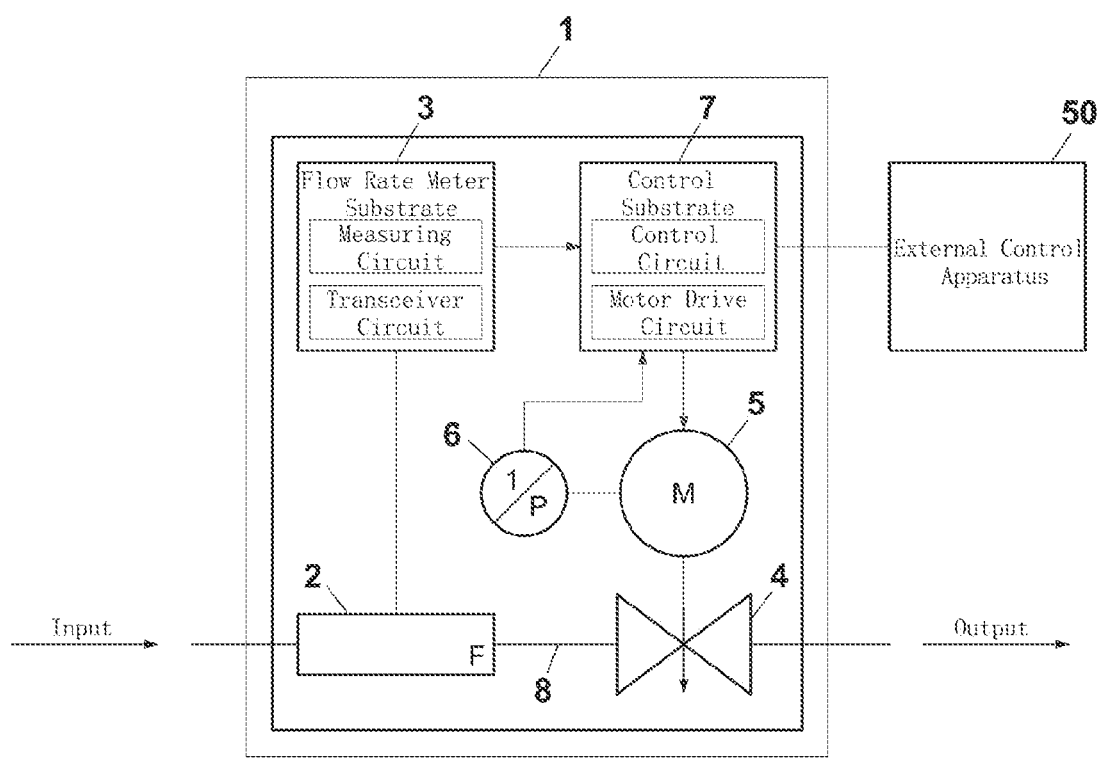
FIG. 1 is a functional block diagram of a flow rate control device of the present invention.

A list of reference numbers in the drawings:
1: flow rate control device
2: flow rate meter
3: flow rate meter substrate
4: flow rate regulating valve
5: stepping motor
6: position detection sensor
7: control substrate
8: flow path
9: PFA tube
10: inflow port
11: outflow port
12: measuring pipe
13: ultrasonic sensor
14: ultrasonic sensor
15: valve body
16: diaphragm
17: needle
18: motor actuator
19: shaft body
20: motor shaft
21: spring member
22: valve seat 23: connector substrate
24: I/O connector
25: communication connector
26: magnet
50: external control apparatus

DETAILED DESCRIPTION

In the following, reference to the drawings will be made to explain the way of implementing the present invention.

As shown in FIG. 1, a flow rate control device 1 of the present embodiment is a device that integrates a flow rate measuring part and a flow rate control part, and is constructed to comprise a flow rate meter 2, a flow rate meter substrate 3 as the flow rate measuring part, to comprise a flow rate regulating valve 4, a stepping motor 5, a position detection sensor 6 and a control substrate (control part) 7 as the flow rate control part. The control substrate 7 is connected with an external control apparatus 50, and performs the power supply and/or receiving and transmitting of various signals from the external control apparatus 50.

Figure 2:
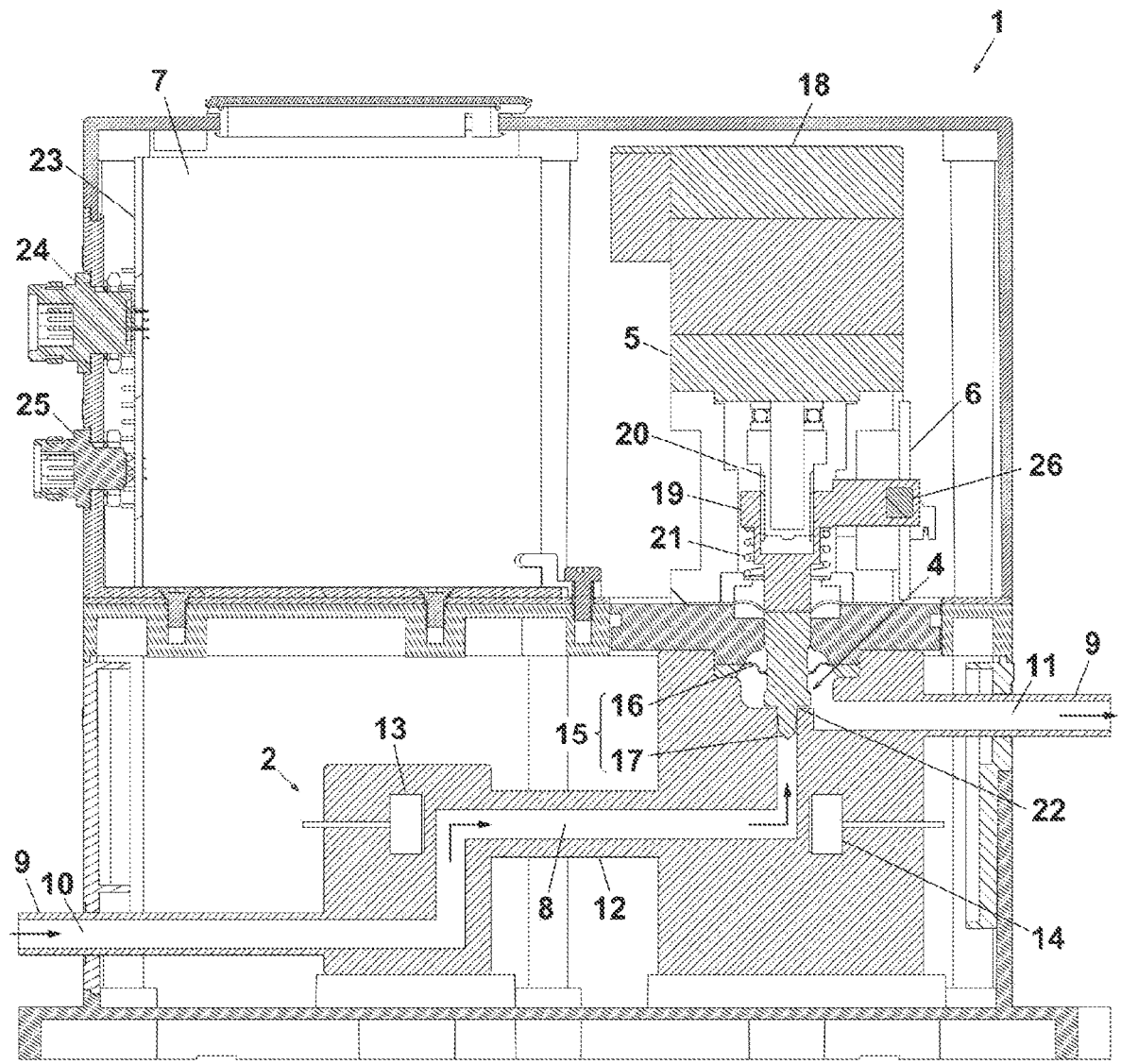
FIG. 2 is an internal structure view of the device.

The flow rate meter 2 measures a flow rate of fluid flowing through a flow path 8. As shown in FIG. 2, the flow rate meter 2 of the present embodiment is an ultrasonic flow rate meter, and is provided with a straight pipe-type measuring pipe 12 in a middle way of the flow path 8 connected to an outflow port 11 from an inflow port 10 on which a PFA tube 9 is mounted. Ultrasonic sensors 13 and 14 consisting of a pair of opposite ultrasonic oscillators are mounted at both ends of the measuring pipe 12. The ultrasonic sensors 13, 14 are alternately switched as a transmitter and a receiver, ultrasonic waves transmitted from one ultrasonic sensor 13 (14) are received by another ultrasonic sensor 14 (13) with respect to the fluid flowing in the measuring pipe 12, so as to measure the flow rate of the fluid based on the difference between the propagation time of the forward ultrasonic wave of the fluid and the propagation time of the reverse ultrasonic wave.

The flow rate meter substrate 3 comprises a transceiver circuit and a measuring circuit. The transceiver circuit excites the ultrasonic oscillator according to a command signal from the measuring circuit, and transmits and receives a ultrasonic pulse generated by the ultrasonic sensors 13 and 14. The measuring circuit has an arithmetic processing part such as a CPU (Central Processing Unit), the measuring circuit measures the propagation time required from the transmission of the ultrasonic pulse generated by the ultrasonic sensors 13, 14 to the reception of the ultrasonic pulse, calculates a flow velocity based on the difference between the forward propagation time and the reverse propagation time of the fluid, and converts the calculated flow velocity into a flow rate value (instantaneous flow rate value, accumulated flow rate value) and outputs to the control substrate 7.

The flow rate regulating valve 4 regulates the flow rate of the fluid flowing through the flow path 8. As shown in FIG. 2, the flow rate regulating valve 4 of the present embodiment is an electric needle valve capable of adjusting the opening degree from fully closed degree (0%) to fully open degree (100%). The electric needle valve comprises a diaphragm 16 and a needle 17 as a valve body 15, and comprises a motor actuator 18 including the stepping motor 5 as a driving part. The valve body 15 is connected with a shaft body 19, and the shaft body 19 is mounted with a motor shaft 20 of the stepping motor 5 at a rear end thereof, performs a linear motion operation by suppressing a rotational force on a side surface of the shaft body 19, and is always urged rearward (in a direction away from a valve seat 22) by a spring member 21.

Regarding the flow rate regulating valve 4, if the stepping motor 5 is rotated so that the motor shaft 20 is rotated by the drive of the motor actuator 18, then the shaft body 19 advances against the urging force of the spring member 21 by driving force of the motor shaft 20, and the valve body 15 connected to the shaft body 19 approaches the valve seat 22. In addition, if the stepping motor 5 is rotated reversely so that the motor shaft 20 is rotated reversely by the drive of the motor actuator 18, then the shaft body 19 is pushed back by the urging force of the spring member 21, and the valve body 15 connected to the shaft body 19 separates from the valve seat 22. Thus, the needle 17 of the valve body 15 is driven by the motor actuator 18 to approach the valve seat 22 or separate from the valve seat 22, thereof the valve opening degree which is the gap between the needle 17 and the valve seat 22 is adjusted. It should be noted that the motor actuator 18 comprises a reducer, a position detection sensor 6, in addition to the stepping motor 5.

On the control substrate 7, the external control apparatus 50 is connected to an I/O connector 24 and a communication connector 25 provided on a connector substrate 23 shown in FIG. 2 via an I/O connector cable and a communication connector cable not shown. The control substrate 7 receives a power supply from the external control apparatus 50, and receives and transmits various signals from/to the external control apparatus 50. A signal received from the external control apparatus 50 is a power input signal, a command input signal for setting a target value, a control input signal for controlling ON/OFF, and so on, and a signal transmitted to the external control apparatus 50 is a flow rate output signal.

The control substrate 7 comprises a control circuit and a motor drive circuit. The control substrate 7 controls the motor actuator 18 based on the measurement result of the flow rate meter 2, and performs feedback control (PID control) on the opening degree of the flow rate regulating valve 4. The control circuit has an computing processing part such as a CPU, and outputs a pulse signal of a rectangular wave for controlling the stepping motor 5 to the motor driving circuit based on a flow rate value (instantaneous flow rate value, accumulated flow rate value) received from the flow rate meter substrate 3 and a command input signal received from the external control apparatus 50. In addition, the control circuit causes the position detection sensor 6 to detect a magnetic force using a magnet 26 mounted to the shaft body 19 of the stepping motor 5, and detects the position of the shaft body 19 of the stepping motor 5 based on a voltage signal from the position detection sensor 6. The motor driving circuit generates and outputs an excitation signal according to a pulse signal output from the control circuit, thereby controlling the driving of the stepping motor 5.

The above is the construction of the flow rate control device 1 according to the present embodiment. Next, a flow rate control method performed by the device will be described with reference to FIG. 3 and FIG. 4.

Figure 3:
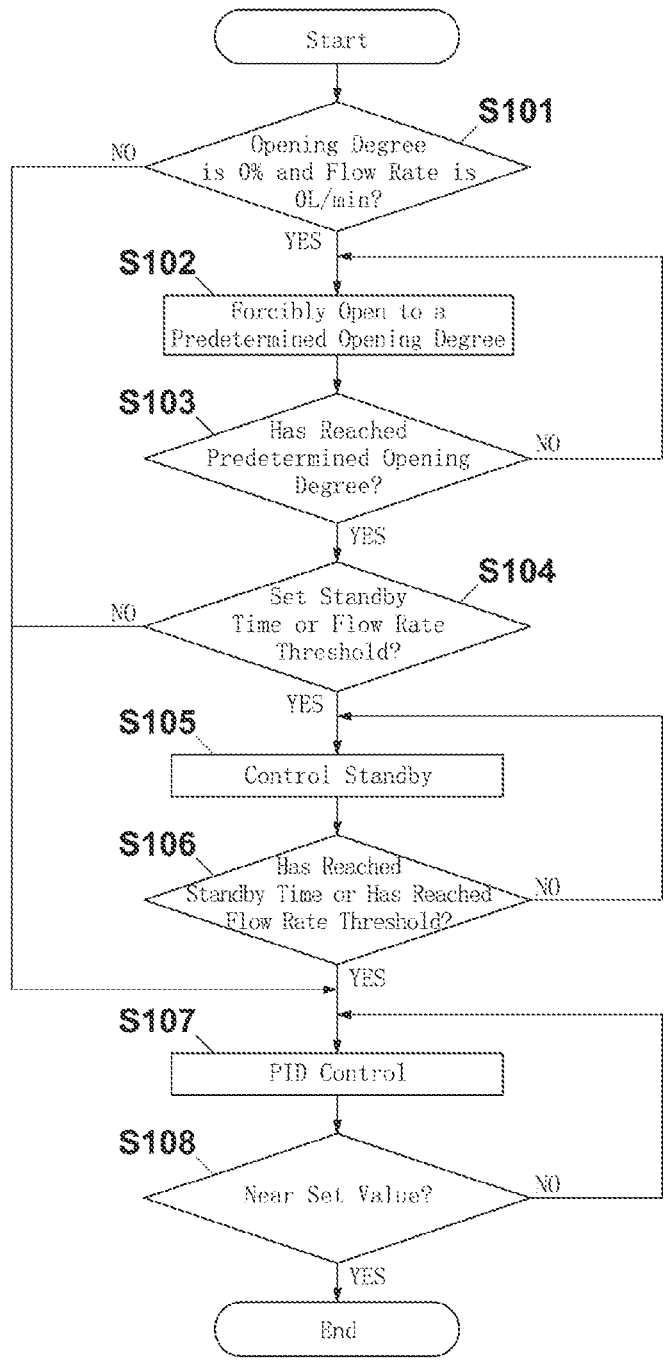
FIG. 3 is a flowchart showing an example of a flow rate control method performed by the device.
Figure 4:
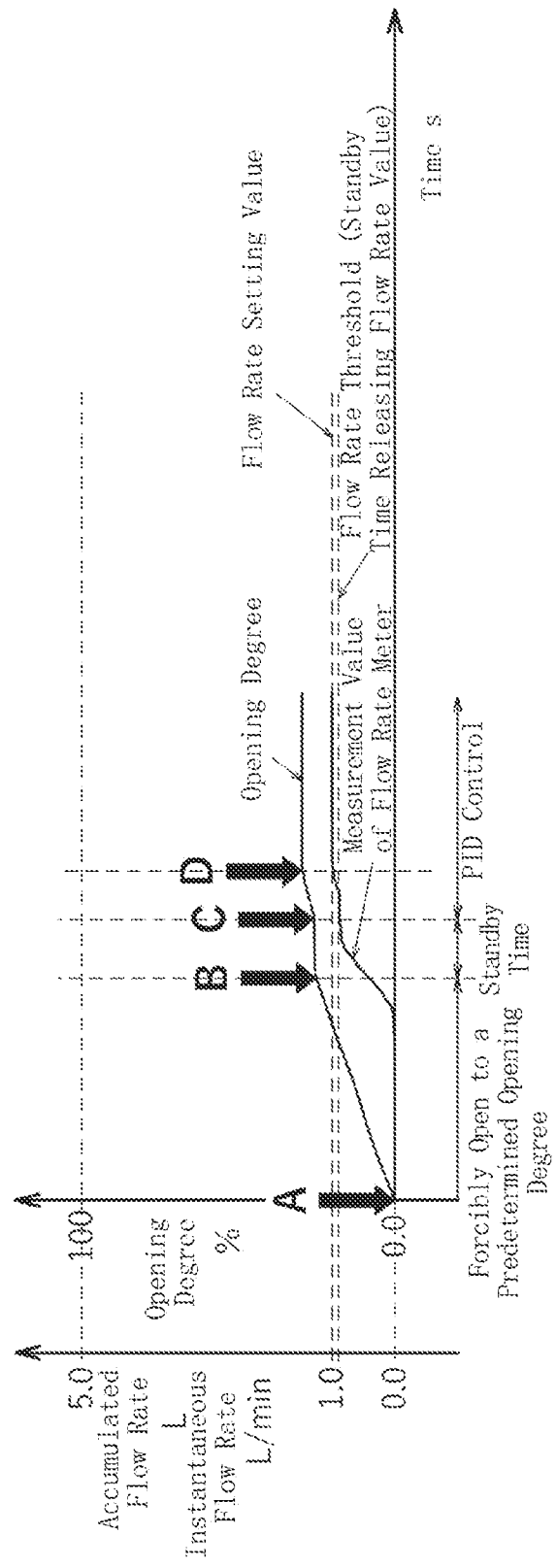
FIG. 4 is a view showing a specific example of the operation performed by the device.

In FIG. 3, in a state where the opening degree of the flow rate regulating valve 4 is fully closed (0%) and the instantaneous flow rate value measured by the flow rate meter 2 is 0 L/min, a flow rate control is started (YES in step 101) (point A in FIG. 4). Although the flow rate control is performed in a direction of a target flow rate setting value, it may be that a PID control is not performed at the time when the flow rate control is started, and an opening degree command signal is output to forcibly open the opening degree of the flow rate regulating valve 4 from fully closed degree (0%) to a predetermined opening degree (step 102) (point A to point B in FIG. 4). Therefore, a water stop margin of the flow rate regulating valve 4 can be eliminated, and the outflow of the fluid can be accelerated. This process is a low flow rate rapid valve opening function.

When the actual opening degree reaches the predetermined opening degree immediately after the flow rate rapid valve opening function works (YES in step 103), it is determined whether or not a standby time or a flow rate threshold has been set (step 104). Here, when the standby time or the flow rate threshold has not been set (NO in step 104), a normal PID control is started (step 107), but when the standby time or the flow rate threshold has been set (YES in step 104), a control standby is performed without performing the PID control (step 105). That is, the flow rate control will be standby until the preset standby time or the preset flow rate threshold is reached. This process is an overshoot suppression function.

By the working of the overshoot suppression function, the standby control is performed continuously for the duration of the preset standby time (NO in step 106), or until the flow rate threshold (i.e., the standby time releases the flow rate value) has been reached during the preset standby time is running, whichever comes the first (YES in step 106), the control standby will be released, and the normal PID control is started (step 107). In the PID control here, a deviation is calculated by using a saturated flow rate value, thus an appropriate deviation is calculated without mistaken identification, and the opening degree is fine-tuned (from point C to point D in FIG. 4). With this PID control, the flow rate control is continued until a measurement result of the flow rate meter 2 becomes near the set flow rate value (NO in step 108), and if it becomes near the set flow rate value (YES in step 108) (point D in FIG. 4), the flow rate control is terminated.

Thus, by the low flow rate rapid valve opening function, it is possible to improve the responsiveness at the beginning of the flow rate control based on the instantaneous flow rate from the flow rate of OL. Also, although the overshoot at the beginning of flow rate control generates easily only by the low flow rate rapid valve opening function, the overshoot can be effectively suppressed by combining the overshoot suppression function, thereby controlling standby until the preset standby time or the flow rate threshold is reached immediately after the low flow rate rapid valve opening function works.

Figure 5:
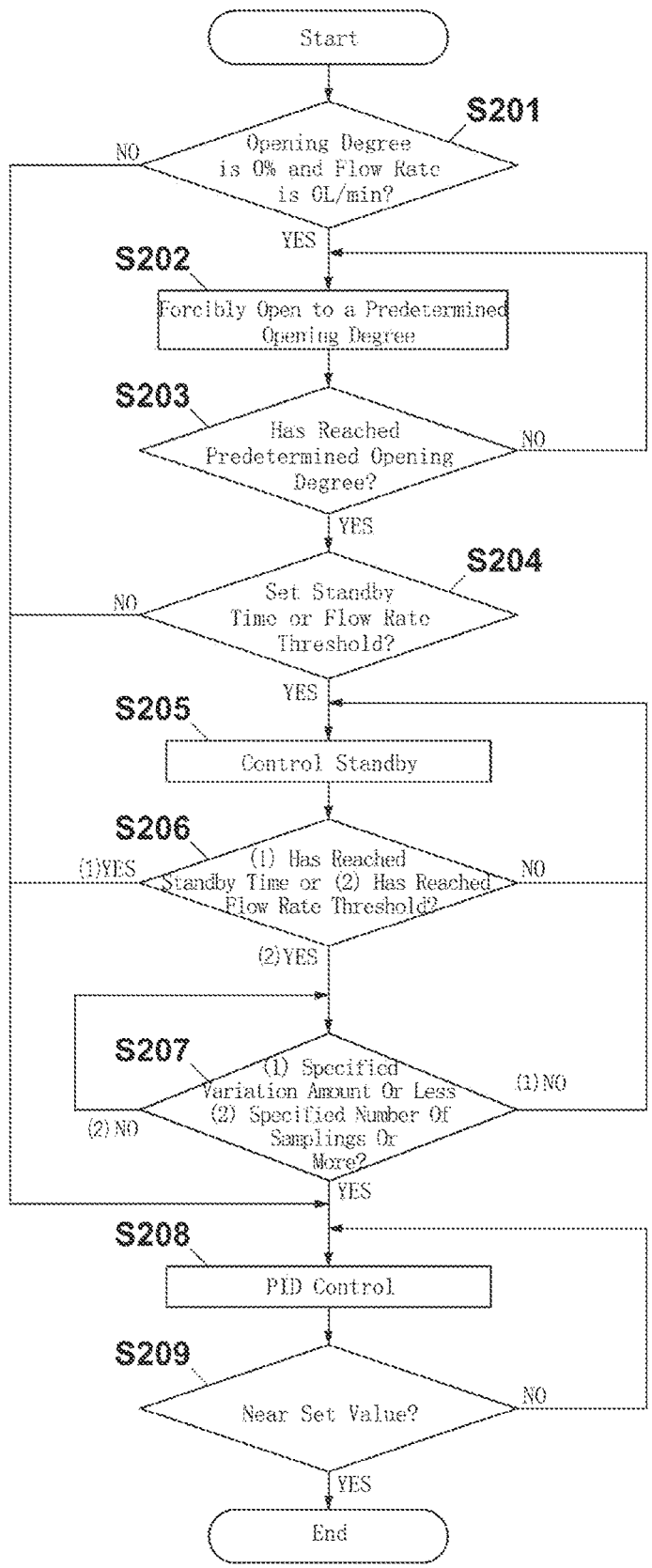
FIG. 5 is a flowchart showing another example of the flow rate control method performed by the device.

It should be noted that the overshoot suppression function can also adopt a controlling method shown in FIG. 5. The processes of steps 201 to 206 shown in FIG. 5 are the same as those of steps 101 to 106 shown in FIG. 3. The difference is that, in step 207, in a case where a specified variation amount or less and a specified sampling times or more are detected (YES in step 106), it is determined that the preset flow rate threshold has been reached and the PID control is started (step 208). Here, "specified sampling times" refers to the number of times of sampling the flow rate measurement and comparing every a certain period (for example, 10 ms) and. In addition, instead of the case where the specified variation amount or less and the specified sampling times or more are detected, in a case where a set flow rate value or more is continuously detected for a plurality of times, it may be determined that the preset flow rate threshold has been reached. By applying such a process, it is possible to prevent erroneous detection due to the influence of pressure variation or the like.

In the embodiments described above, although the ultrasonic flow rate meter is adopted as the flow rate meter 2, the flow rate meter constituting the flow rate measuring part is not limited thereto, and other flow rate meters such as a Karman vortex flow rate meter, an impeller flow rate meter, an area flow rate meter, a Coriolis flow rate meter, a differential pressure flow rate meter, an electromagnetic flow rate meter, and a thermal flow rate meter can be used. In addition, although the electric needle valve is adopted as the flow rate regulating valve 4, the flow rate regulating valve constituting the flow rate control part is not limited thereto, and other valves such as an air needle valve, a constant pressure valve, a ball valve, a butterfly valve, and a globe valve can be used.

What is claimed is:
1. A flow rate control device comprising:
a flow rate meter that measures a flow rate of a fluid flowing through a flow path;
a flow rate regulating valve that regulates the flow rate of the fluid flowing through the flow path; and
a control part that controls an opening degree of the flow rate regulating valve based on a measurement result of the flow rate meter,
wherein the flow rate control device includes:
a low flow rate rapid valve opening function that accelerates an outflow of the fluid by forcibly opening the opening degree of the flow rate regulating valve from fully closed degree to a designated opening degree when the opening degree of the flow regulating valve is fully closed and a flow rate control is started; and
an overshoot suppressing function that is used for suppressing the overshoot by, immediately after the low flow rate rapid valve opening function starts to work, standing by in a state holding the opening degree of the flow rate regulating valve being forcibly opened to the designated opening degree till whichever comes first between a lapse of a duration of a preset standby time and a preset flow rate threshold being reached,
wherein the preset flow rate threshold is determined to be reached when a specified flow rate variation amount or less and a specified number of sampling times or more are detected, or when a set flow rate value or more is continuously detected for a plurality of times.
2. The flow rate control device according to claim 1, wherein in the low flow rate rapid valve opening function, the flow rate control device sets that the opening degree of the flow rate regulating valve is forcibly opened from fully closed degree to the designated opening degree in the state that the opening degree of the flow rate regulating valve is fully closed and an instantaneous flow rate value measured by the flow rate meter is OL/min.

* * * * *